F. PALLAUSCH.
Apparatus for Refrigerating Air for Cooling Beer
and other Liquids.

No. 216,884.  Patented June 24, 1879.

Witnesses:
Penn? Halsted
D. P. Cowl

Inventor:
Franz Pallausch
by John J. Halsted
Atty.

UNITED STATES PATENT OFFICE.

FRANZ PALLAUSCH, OF VIENNA, AUSTRIA.

IMPROVEMENT IN APPARATUS FOR REFRIGERATING AIR FOR COOLING BEER AND OTHER LIQUIDS.

Specification forming part of Letters Patent No. 216,884, dated June 24, 1879; application filed October 2, 1878.

*To all whom it may concern:*

Be it known that I, FRANZ PALLAUSCH, of Vienna, Empire of Austria, have invented a certain new and useful Apparatus applicable in Refrigerating Fermenting Beer and other Liquids, of which the following is a specification.

My invention consists of a vessel fitted inwardly with strips or plates covered with coarse weavings or other material of great capillary power, maintained in a moist state, and arranged in irregular or zigzag lines, in combination with means for forcing a current of air or any other suitable gas through said vessel, the cooling apparatus being located in an ice-box, and the current of air not coming in contact with the ice, all as more particularly hereinafter described, and whereby the ice melts but slowly, and evaporation is actively maintained.

The liquid caused to evaporate may be water, ether, alcohol, or any other volatile substance, or a mixture of such substances.

Figure 2:
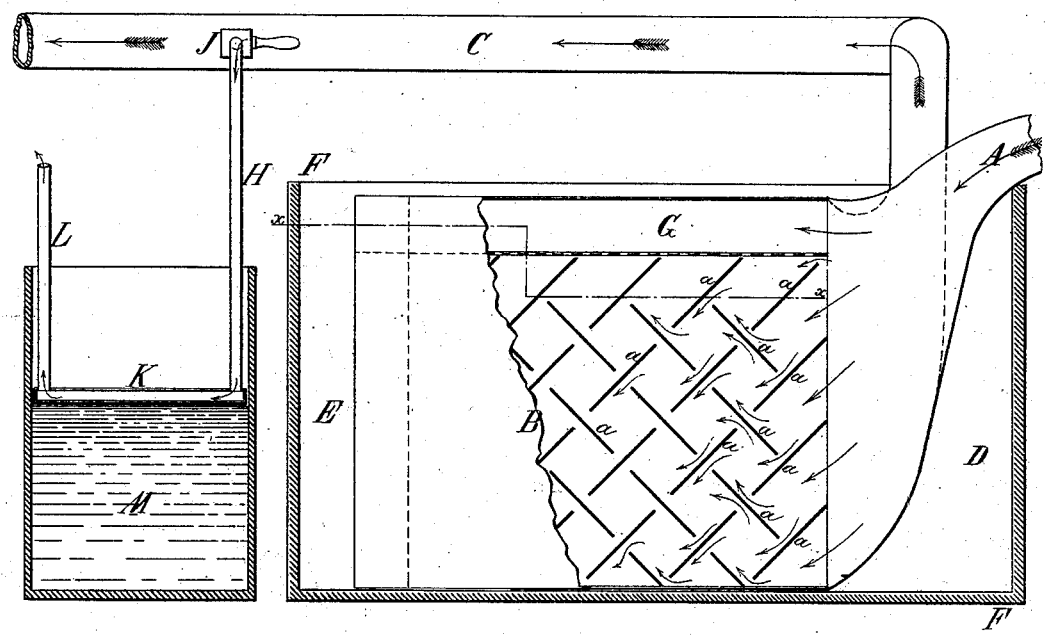
Figure 1:
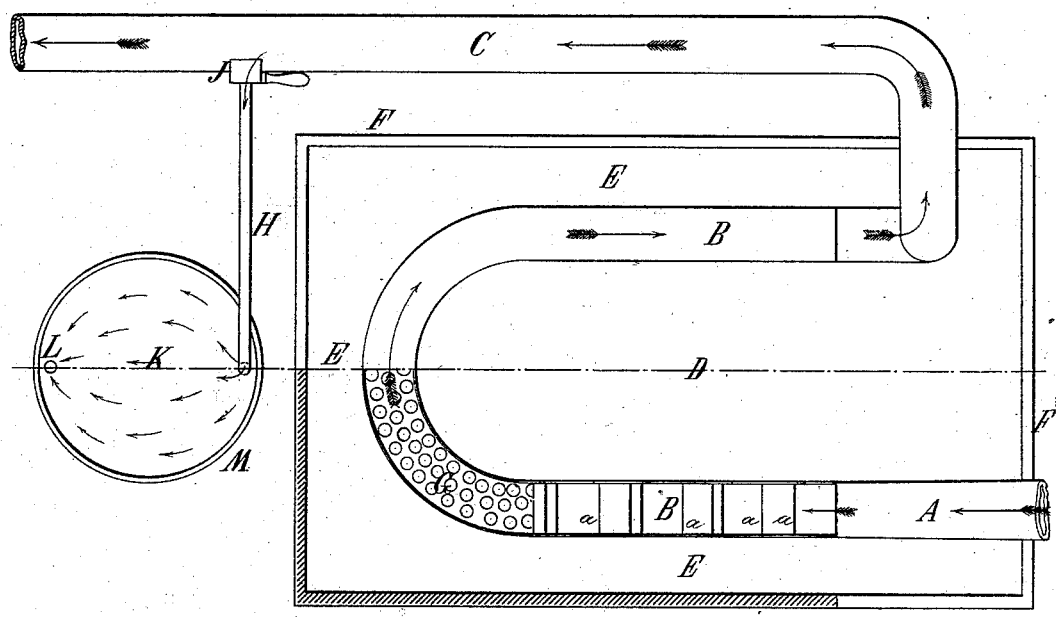

The annexed drawings show, in Figure 1, a plan view, and in Fig. 2 an elevation, of my refrigerating apparatus as being employed to cool beer in the vessels.

B is, in this case, a horseshoe-shaped box or vessel, located in the ice-box D E, and to be surrounded by ice and fitted inwardly with an arrangement of strips or plates, *a a*, of wood, tinned iron, zinc, or other suitable material, and set opposite one another, and are in practice to be covered with felt or cotton, coarse weavings or fabrics, or any other material of great capillary power, to present to the evaporating liquid the largest possible surface.

G is a gutter, having a perforated bottom, and placed inside the vessel B on its upper rim or edge, and to be filled with pieces of ice, or water may be led into the same. A is a conduit-pipe, by which a blast or current of air, generated in any desired manner, is directed into and through the vessel B. In consequence of the peculiar arrangement of the strips or plates *a a*, this current of air is forced in a zigzag line along and over the said evaporating-surfaces, a part of the current being employed to melt the ice in the gutter G.

The ice-water formed in the vessel B may be drawn or let off by means of any appropriate cock at or near its bottom, and not necessary to be shown. Another cock, not needing to be shown, may serve to let off the ice-water from the vessel E, surrounding the vessel B and the ice-gutter. The cooled air, after having passed through the vessel B, is directed through the pipe C into the room to be cooled. The branch pipes H lead into the refrigeratories K, floating upon the beer in the vessels M.

J J are cocks to regulate the admission of air. L are outlet-pipes for the exhausted air.

By means of this apparatus air of a temperature of 16° to 18° Reaumur may in a few seconds be cooled to nearly the freezing-point.

In the manufacture of beer it has usually been customary to keep the brewing at the proper temperature by means of floaters filled with ice, each fermenting vessel or tun containing a floater which had to be filled daily, according to its size, with, say, three hundred pounds of ice, and even oftener if the temperature of the place were too high or the ventilation poor. This required a great amount of labor in the larger breweries, where hundreds of fermenting-tuns are in use, as also a very large quantity of ice, and the emptying and refilling of the floaters, and likewise at the same time disturbed the fermenting beer. By my invention, however, the needed working force, as well as the amount of ice used, is greatly diminished, and any perturbation of the beer under fermentation is avoided.

The fibrous materials or wicks above named, by reason of their well-known capillary power, take up the moisture along the plates or strips *a a*, and this moisture slowly accumulates at the bottom of the air-duct in a few drops of water, which may be carried off like the water of the ice-box and of the wooden inclosure or vessel by means of proper faucets. As the strong current of air when entering takes up and absorbs a large part of the waste moisture, it will result that a very small amount of ice in the interior of the box melts, and even that contained in the surrounding case melts but very slowly, besides keeping the air which passes out of the apparatus into the conducting-pipe C at about 0° Celsius, as has been practically ascertained in a room heated to about 18° Celsius.

If ether or some other rapidly-evaporating spirit or material be thus made to evaporate in the apparatus, it is possible to obtain a still lower degree of temperature. There may be as many branch pipes H as there are fermenting-vats in the fermenting-room.

It will be seen that as the flow or current of cold air passes into and through the refrigeratories K, the beer under treatment remains undisturbed during the entire process of fermentation, every other manipulation being unnecessary, and thus labor is saved, and also that only pure cold air will be forced into the fermenting-room, thus rendering it possible to obtain for the same an even, steady temperature, even in fall and winter.

This apparatus and method are applicable for distilleries, chemical laboratories, theaters, schools, cars for transporting meat, &c.

It is obvious that the above-described refrigerating apparatus may be varied in form and immaterial details, according to the purpose, without departing from the substance of my invention.

What I claim is—

A refrigerating apparatus consisting in a vessel fitted inwardly with strips or plates covered with coarse weavings or other material of great capillary power, maintained in a moist state, and arranged in zigzag lines, in combination with means for forcing a current of air through the interior of the said vessel, the whole located in an ice-box, substantially as set forth, and shown in the annexed drawings.

In witness that I claim the foregoing I have hereunto set my hand.

FRANZ PALLAUSCH.

Witnesses:
HEINRICH PALMPT,
EDUARD WINKELMANN.